Oct. 1, 1946.  J. EVANS  2,408,383

ELECTRIC DISCHARGE DEVICE

Filed Aug. 30, 1941

Inventor
JOHN EVANS
By
Attorney

Patented Oct. 1, 1946

2,408,383

UNITED STATES PATENT OFFICE 2,408,383

ELECTRIC DISCHARGE DEVICE

John Evans, Palmyra, N. J., assignor to Radio Corporation of America, a corporation of Delaware Application August 30, 1941, Serial No. 408,961

6 Claims. (Cl. 250—167)

My present invention relates to electric discharge devices, particularly cathode ray tubes and has for its principal object to provide an improved apparatus for visually indicating the presence of an object in darkness by utilization of invisible emanations from said object.

It will be appreciated by those skilled in the art to which my invention appertains that every object has an instantaneous temperature which differs from the temperature of its background by an increment determined by the thermal lag of said object. It follows, therefore, that invisible rays are continuously emanating from all objects.

My present invention contemplates the application of principles heretofore employed in television systems, in the conversion of such invisible rays into a visible image of the object from which the said rays emanate. The prinicipal difficulty encountered in the application of television methods to such use resides in the fact that the "mosaic" electrodes employed in conventional television transmitting tubes are not responsive to rays of a wave length below the visible portion of the spectrum.

Accordingly, another and important object of my invention is to provide a "mosaic" electrode of novel construction and which is sensitive to rays of a wave length below the visible portion of the spectrum.

Figure 1:
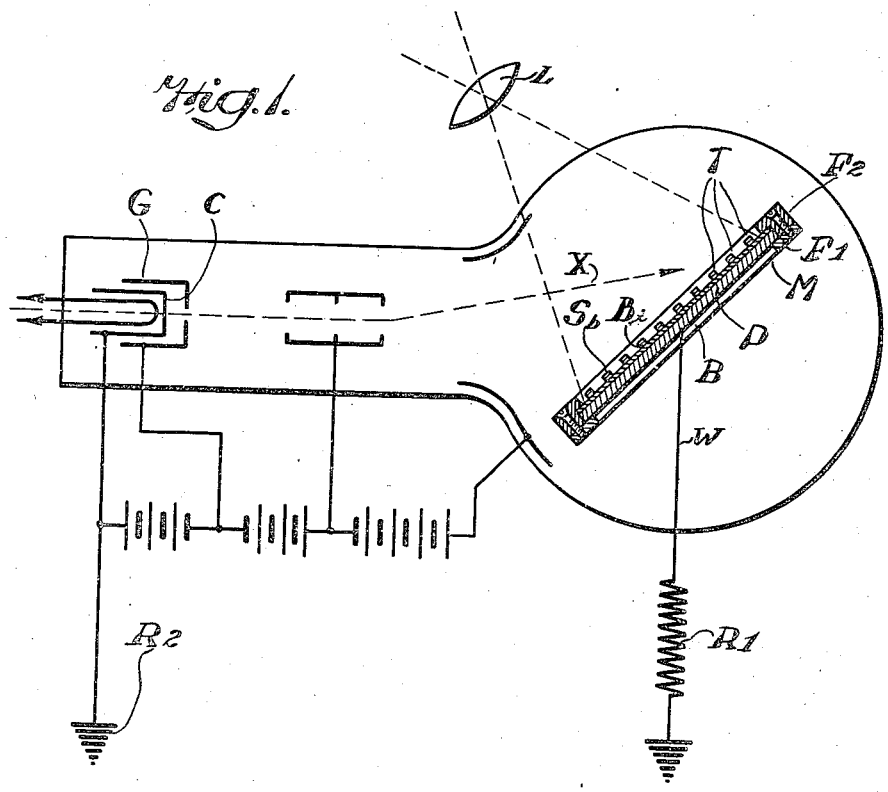
Figure 2:
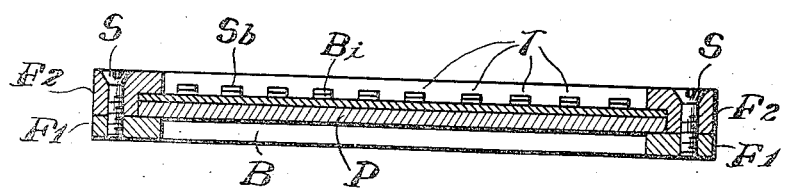

Other objects and advantages, together with certain details of construction, will be apparent and my invention itself will be best understood by reference to the following specification and to the accompanying drawing wherein:

Figure 1 is a partly diagrammatic view of a television transmitting tube incorporating a thermoelectric mosaic electrode constructed in accordance with the principle of my invention, and Figure 2 is a longitudinal sectional view of the said mosaic electrode during an intermediate stage of its manufacture.

My invention contemplates the provision in an otherwise conventional television transmitter tube T of an image cathode M comprising a multiplicity of physically discrete thermocouples T mounted upon an electrically conductive base or "signal plate" P. The invisible image to be televised is focused upon the said thermoelectric surface of the mosaic as by means of a suitable lens system which is exemplified in the drawing by a single lens L which may be constituted of rock salt or other suitable substance. The invisible rays, of which the image is constituted, set up a potential in each thermocouple T. These separate potentials are proportional to the instantaneous intensity of the rays which impinge thereon. As in conventional practice, the signal plate P is connected to ground through a signal coupling resistor R1 and since the cathode C of the electron gun G from which the scanning beam X emanates is connected to ground, as indicated at R2, the separate potential which is set up in each thermocouple is isolated until the circuit between the electron gun and the said thermal elements is completed by way of the electron beam. Thus, during the scanning cycle the potential difference in each thermal element is sequentially caused to appear across the signal resistor R1. The potential difference across this output resistor is thus proportional to the instantaneous intensity of the invisible rays which impinge thereon, provided only that the thermal coupling between the separate thermocouples T by way of the signal plate P is not such as to produce a state of thermal equilibrium. To obviate the possibility of thermal equilibrium, I make the backing plate B as thin as possible, commensurate with mechanical strength.

In making a thermal-responsive image-cathode in accordance with my invention, I first provide a temporary backing plate B (Fig. 2) upon which I subsequently form the signal plate P and its thermal-responsive elements T. I prefer to make this temporary support B of cellulose acetate or equivalent synthetic plastic material and to form it by pouring a solution of the plastic material upon a body of water and subsequently lowering the water level so that the resultant film is deposited upon a suitable frame F1 (Fig. 2). When this film or membrane B is thoroughly dry, I form a signal plate P thereon, preferably in vacuo, as by evaporating or otherwise depositing thereon a thin layer or film of gold, platinum or other non-oxidizable or difficultly oxidizable metal. I then place a half tone screen (not shown) over the now plated surface P of the temporary support B and by a similar process successively deposit, through the interstices in the screen, two layers Bi and Sb, respectively, of different metals selected from the thermo-electric series. I prefer to use bismuth and antimony, in either order, as these metals lie at the extremes of the thermoelectric series and hence give rise to the maximum thermo-electric effect, though I may employ other of the thermo-electrically "positive" and "negative" metals selected from the group or series comprising bismuth, platinum, lead, tin, copper, gold, silver, zinc, iron and antimony.

I subsequently remove the half tone screen from the now sensitized signal plate P and fit a second frame F2 over the bottom frame F1 and clamp it securely in place as by means of screws S. I then remove the temporary supporting surface B as by dissolving it with amyl acetate or other suitable solvent, taking care not to puncture or otherwise damage the signal plate P or the discrete thermocouple T thereon. In actaching the necessary electrical lead W to the now otherwise completed image cathode of my invention I make the connection to that frame section (F2) which is in direct contact with the signal plate P1 rather than directly to the said plate and thereby avoid the difficulties incident to affixing the lead to this film-like surface.

Various modifications of the apparatus and method of my invention will suggest themselves to those skilled in the art. It is to be understood therefore that the foregoing is to be interpreted as illustrative and not in a limiting sense except as required by the spirit of the appended claims.

What is claimed is:

1. An image cathode adapted to respond to rays below the visible spectrum, said cathode comprising an electrically conducting surface having a multiplicity of discrete elemental areas thereon formed of a plurality of superimposed layers constituted of different metals selected from the thermoelectric series.

2. The invention as set forth in claim 1 and wherein said metallic layers comprise bismuth and antimony.

3. The invention as set forth in claim 1 and wherein said electrically conducting surface comprises a film-like structure constituted of a relatively non-oxidizable metal.

4. The method of making a heat responsive image cathode which comprises forming a synthetic plastic material into a temporary base for said cathode, depositing a thin layer of a non-oxidizable metal on a surface of said temporary base, forming a multiplicity of discrete thermocouples upon said metal layer, providing the resultant structure with a permanent frame and thereafter dissolving said temporary plastic base.

5. A picture transmitting tube comprising an image cathode comprising an electrically conducting surface having a multiplicity of thermocouples thereon, means for producing an electron beam, and means for scanning said thermocouples with said electron beam.

6. A picture transmitting tube having an image cathode comprising an electrically conducting surface and a multiplicity of discretely mounted thermocouples thereon, means to impress heat rays on said cathode whereby a difference of potential proportionate to the intensity of the impinging rays is set up in said discrete thermocouples, an output terminal for said thermocouples connected to said conducting surface, means in said tube for producing an electron beam, and means for scanning said thermocouples with said electron beam whereby to cause the potential difference in each of said thermocouples to be sequentially transferred through said conducting surface to said output terminal.

JOHN EVANS.